Nov. 11, 1969  L. A. LOFRISCO ET AL  3,478,254
APPARATUS FOR CONTROLLING THE AUTOMATIC POSITIONING
OF A DRIVEN MEMBER
Filed June 1, 1966  6 Sheets-Sheet 1
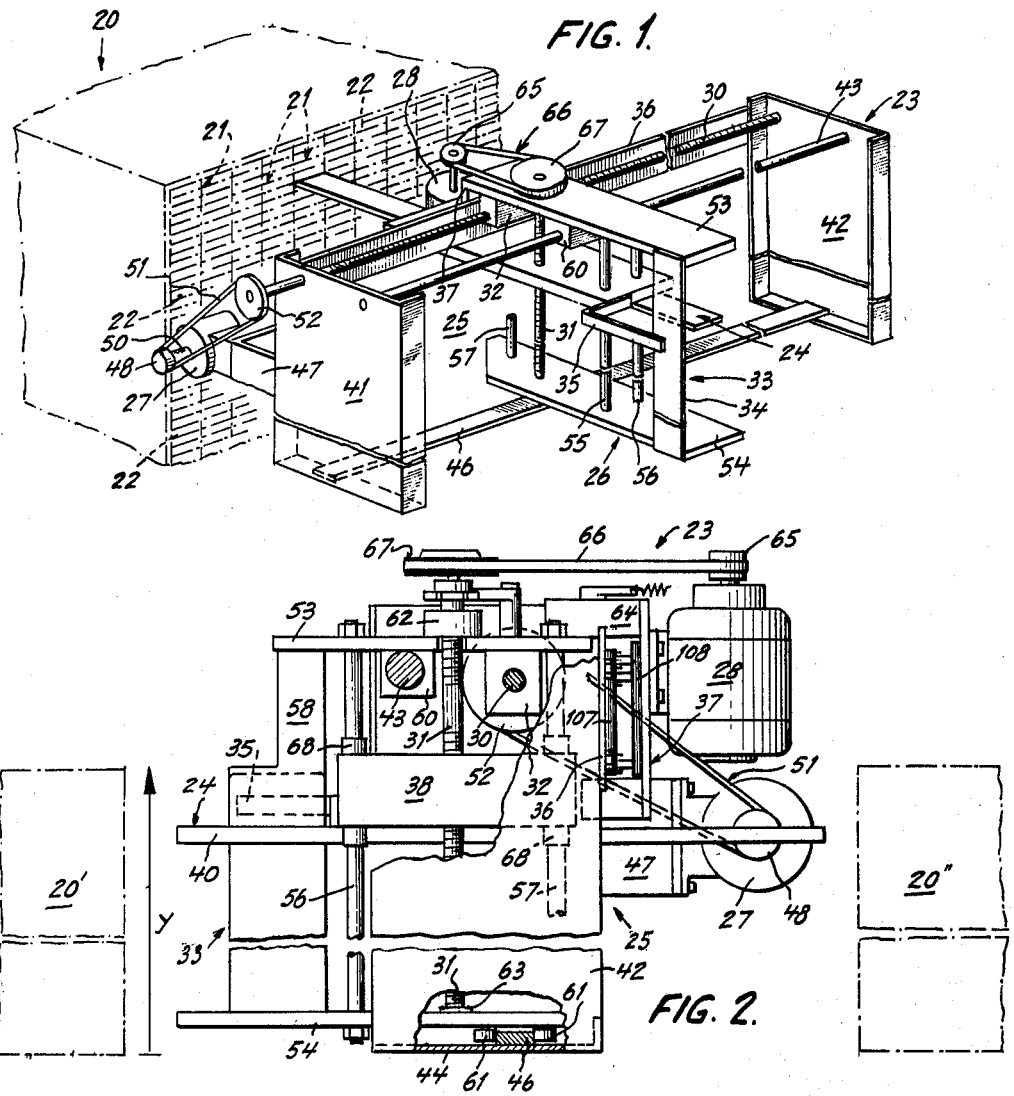
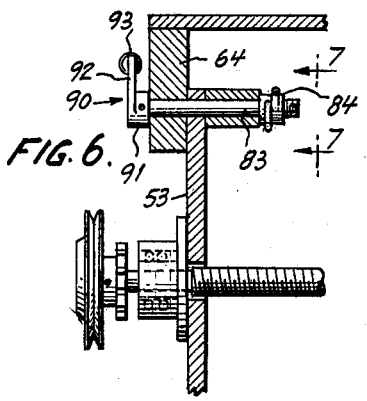
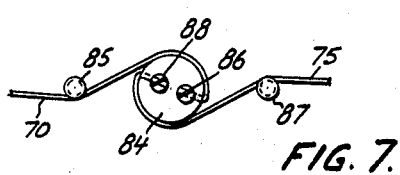
INVENTORS.
LEONARD A. LOFRISCO
ATTILIO A. DEMEO
GERARD O. WALTER
BY
AGENT

INVENTORS.
LEONARD A. LOFRISCO
ATTILIO A. DEMEO
GERARD O. WALTER

BY Frank A. Seemar
AGENT.

FIG. 8.
FIG. 14.
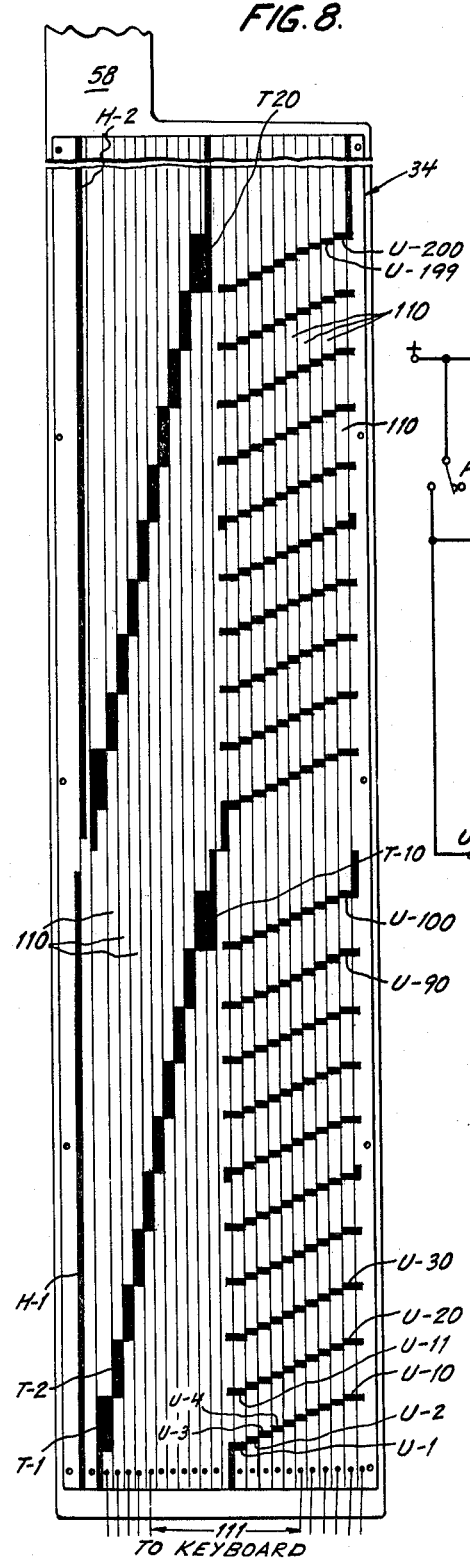
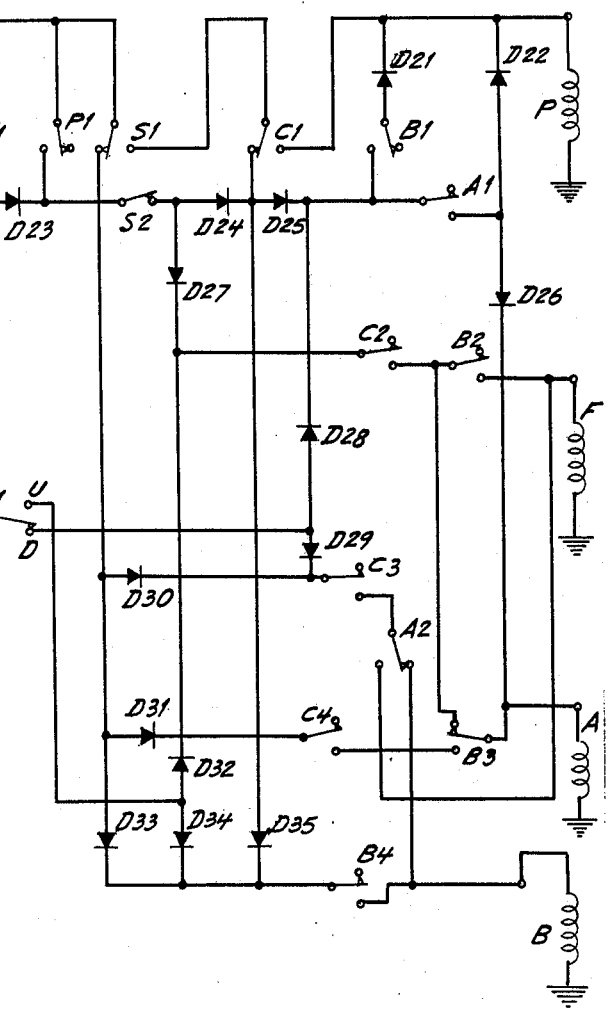
INVENTORS.
LEONARD A. LOFRISCO
ATTILIO A. DEMEO
GERARD O. WALTER
BY Frank A. Seeman
AGENT

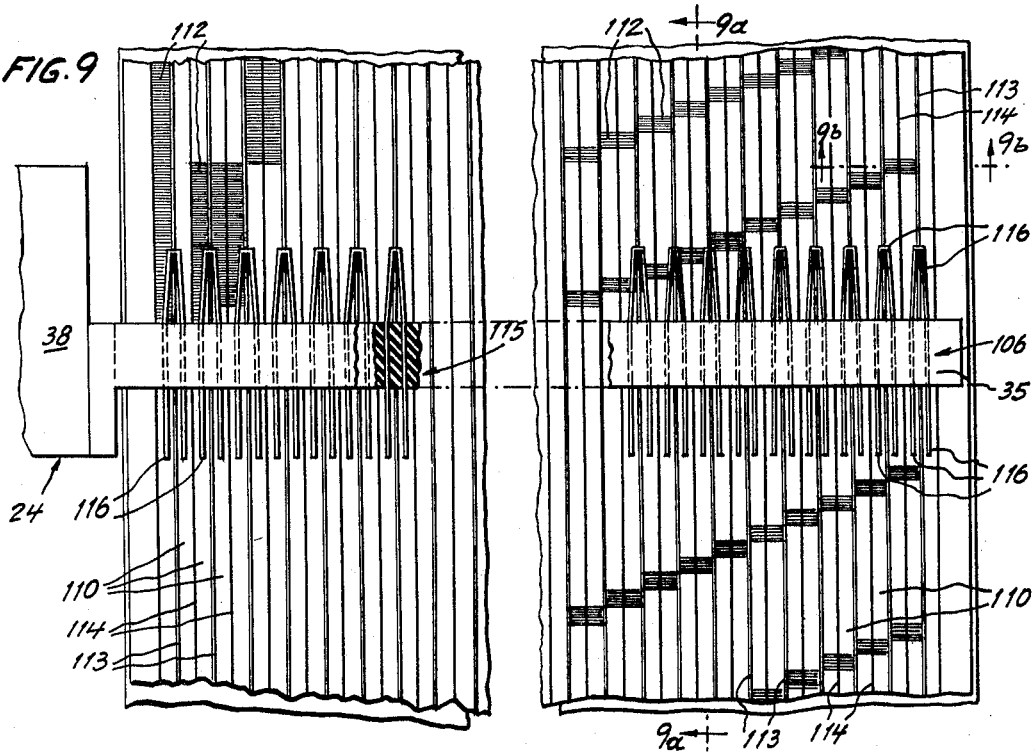
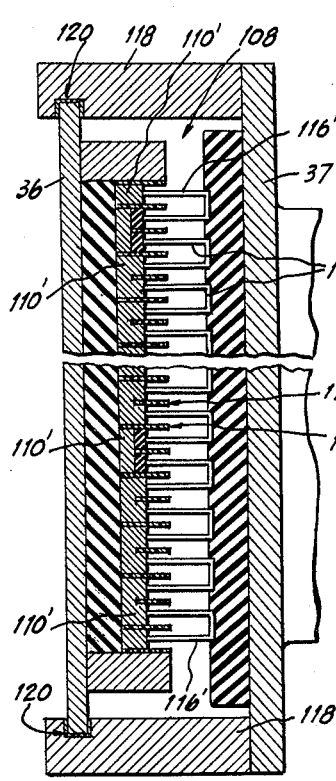
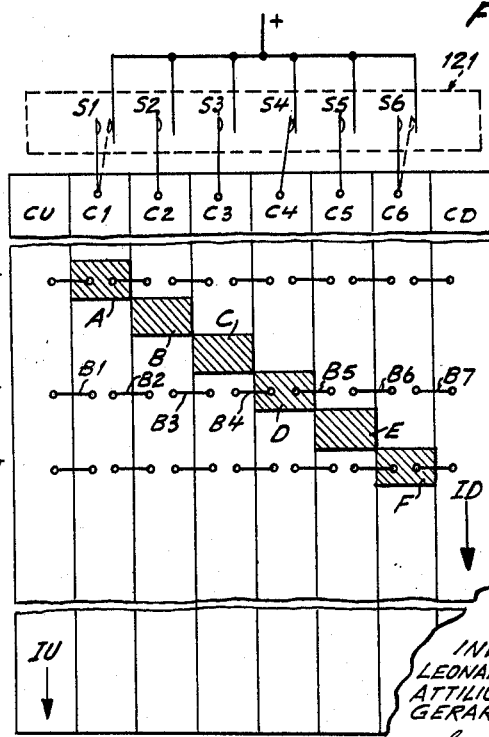

Nov. 11, 1969    L. A. LOFRISCO ET AL    3,478,254
APPARATUS FOR CONTROLLING THE AUTOMATIC POSITIONING
OF A DRIVEN MEMBER
Filed June 1, 1966    6 Sheets-Sheet 5
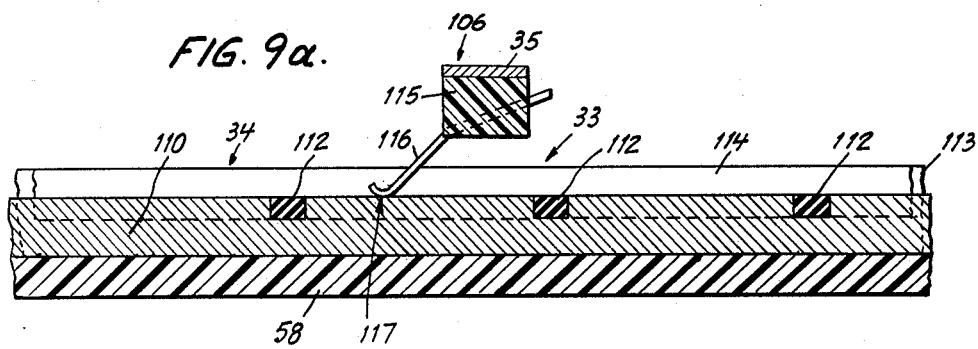
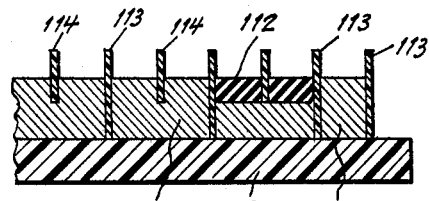
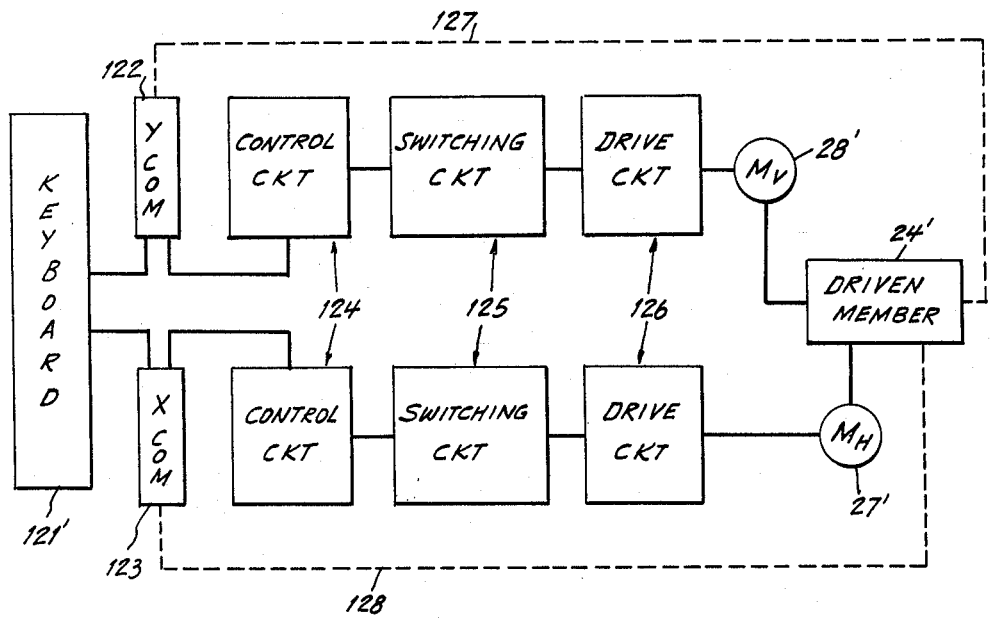
INVENTORS.
LEONARD A. LOFRISCO
ATTILIO A. DEMEO
GERARD O. WALTER
BY Frank A. Seeman
AGENT.

Nov. 11, 1969   L. A. LOFRISCO ET AL   3,478,254
APPARATUS FOR CONTROLLING THE AUTOMATIC POSITIONING
OF A DRIVEN MEMBER
Filed June 1, 1966   6 Sheets-Sheet 6

INVENTORS.
LEONARD A. LOFRISCO
ATTILIO A. DEMEO
GERARD O. WALTER

BY Frank A. Seemar
AGENT 2,478,254
Patented Nov. 11, 1969

3,478,254
APPARATUS FOR CONTROLLING THE AUTOMATIC POSITIONING OF A DRIVEN MEMBER
Leonard A. Lofrisco, New Hyde Park, and Attilio A. De Meo, Brooklyn, N.Y., and Gerard O. Walter, Skillman, N.J., assignors to Sperry Rand Corporation, New York, N.Y., a corporation of Delaware
Filed June 1, 1966, Ser. No. 554,560
Int. Cl. G05b 19/32; H02p 1/54
U.S. Cl. 318—18                          10 Claims

ABSTRACT OF THE DISCLOSURE

A system for automatically controlling the translation of a driven member adjacent a storage device having a plurality of individual storage cells. A transport mechanism carries the driven member from a random position to a preselected destination in response to input data corresponding to any particular storage cell. Appropriate means are employed to transfer the selected stored article to the transport mechanism which then returns to a work station for appropriate action, e.g., the article is removed, modified, replaced, etc., after which article storage may be effected in the reverse manner.

---

The present invention relates to a novel control system and is the property of Sperry Rand Corporation. More particularly the invention relates to new and useful improvements in means for automatically controlling translation of a driven member.

In article handling equipment, as for example, apparatus for storing and retrieving information carrying media, it is known to provide a device having means for storing a plurality of articles in readily accessible storage cells. It is also known to provide an associated article handling mechanism adapted to retrieve and store the articles. In some apparatus of this type a carrier assembly is automatically translated from a random starting position to a destination adjacent the access area of a preselected cell, the article stored in the cell is transferred to the carrier assembly, whereupon the article is carried to a work station. Thereafter, the nature of the article involved determines the handling thereof, e.g., if the article is a segment of microfilm, then the film may be scanned through a viewing aperture. Subsequentially the article is returned to the storage cell by reversing the retrieval steps.

To operate in the foregoing manner the carrier usually includes a positionable driven member responding to input data corresponding to a known physical location, i.e., a particular storage cell. To this end it is common in the article handling art to drive a driven member of such a nature in mutually perpendicular directions by any well known means, e.g., rotatable lead screws orthogonally associated with the carrier assembly. In employing drive means of this general type, it is not uncommon to include complex servo-mechanisms in combination with closely toleranced mechanical components to provide controlled translation of the driven member. Drive resolution is established by the dimensions and spacing of the access area of the cells. Thus, the compactness of the storage container is limited by the relative physical size of the articles being handled as well as the resolution of the control system elements. This gives rise to the necessity of an accurate control system, without which the advantages of compact storage are sacrificed for economy and simplicity. Many problems have been encountered in the past in attempts to provide simple and economical article handling apparatus, due to the increasing demands for accuracy and reliability in this type equipment as well as the ever present desirability of high speed operation.

It is an object of the present invention to provide a novel control system.

Another object is to provide a control system in which novel means are provided to automatically control the translation of a driven member.

A further object is to provide novel means wherein a driven member is accurately translated to any one of many predetermined destinations in a relatively short time and exhibiting a comparatively low cost and high reliability.

A further object is to provide a novel control system in which a driven member is translated at a relatively high speed with a minimal amount of impeding pendulous force.

Yet another object is to provide a novel control system exhibiting high speed and reliability during operation in which a driven member is accurately translated in response to input data corresponding to any one of many predetermined destinations as well as the initial location of the member.

The present invention contemplates a novel control system in which means are provided to automatically control translation of a driven member. In one embodiment the novel system is employed with a storage device having a plurality of individual storage cells. A transport mechanism is provided to carry the driven member from a random position to a preselected destination in response to input data corresponding to any particular storage cell. Articles stored in the cell may be transferred to the driven member by any known means, after which the driven member is automatically returned to a work station. Article storage is effected in the reverse manner of operation. When retrieval is desired, selection of the destination of the driven member is determined by making a manual keyboard entry corresponding to the address of a particular article within the storage device. Motive means are utilized to position the driven member with respect to the storage device in accordance with the keyboard entry. To this end signal producing means are provided to convert the address information at the keyboard to corresponding electrical data. The motive means also include motor operated means adapted to move the driven member along mutually perpendicular axes a distance established by electrical control data.

The system further includes means for operatively coupling the driven member in cooperative relationship with the signal producing means, whereby the actual position of the driven member establishes the conditions under which the electrical control data is derived. The coupling means is adapted to sense the location of the driven member and provide a path for the electrical data to thereby integrate the physical translation function with the electrical control function of the system.

In addition, the novel system is provided with means for counteracting pendulous force exerted on a vertical assembly for carrying the driven member. Under conditions where the driven member is translated in a direction having a horizontal component the counteracting means prevent askew disposition of the assembly.

The foregoing and other objects, features and advantages of the invention will appear more fully hereinafter from a consideration of the detailed description which follows, in conjunction with the accompanying drawings wherein one principal embodiment of the invention is illustrated by way of example. It is to be expressly understood however, that the drawings are for illustrative purposes only and are not to be construed as defining the limits of the invention.

In the drawings wherein like reference characters refer to like parts throughout the several views:

FIG. 1 is a perspective view generally illustrating apparatus in which the present invention is incorporated;

FIG. 2 is a fragmentary end view of the transport assembly illustrated schematically in FIG. 1;

FIG. 6 is a sectional view taken along line 6—6 of FIG. 3;

FIG. 7 is a sectional view taken along line 7—7 of FIG. 6;

FIG. 8 is a detailed plan view of the fixed portion of the vertical commutator assembly;

FIG. 9 is a fragmentary plan view of a sliding brush assembly and shows the relationship of the fixed portion of the commutator assembly associated therewith;

FIG. 9a is a sectional view taken along line 9a—9a of FIG. 9;

FIG. 9b is a sectional view taken along line 9b—9b of FIG. 9;

FIG. 10 is a diagrammatic fragmentary view showing a commutator assembly in section through the brush assembly portion;

FIG. 11 is a schematic diagram illustrating the relationship between a keyboard switching array and a section of the associated commutator assembly employed therewith;

FIG. 12 is a block diagram showing the general relationship between various parts of the illustrated embodiment of subject invention;

FIG. 14 is a schematic diagram showing switching circuitry utilized with the illustrated embodiment of the subject control system.

Figure 3:
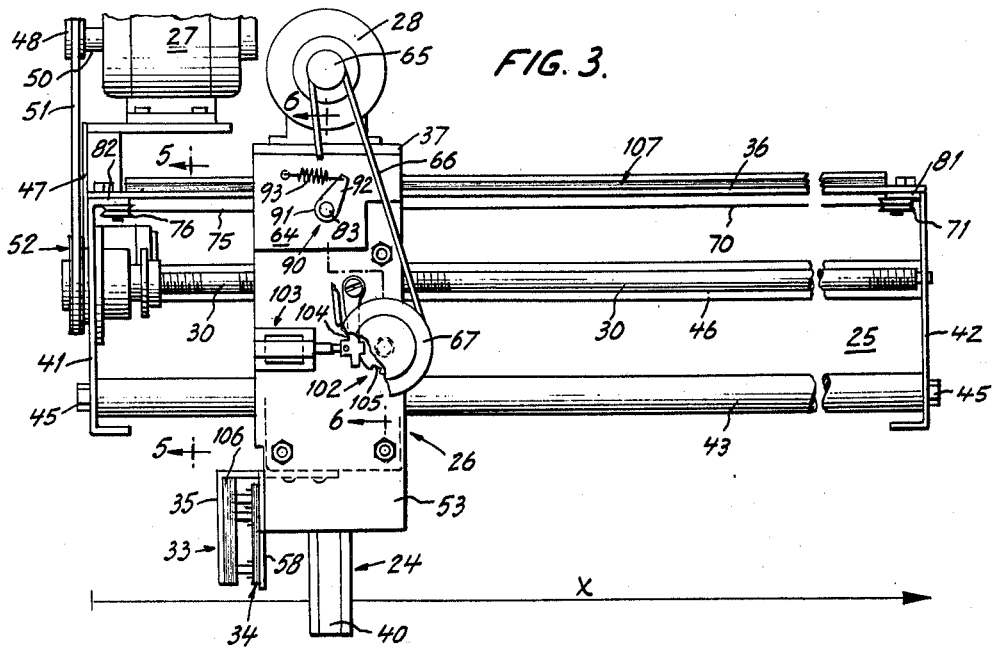
FIG. 3 is a fragmentary plan view of the transport assembly.

Now referring to the drawings for a more detailed description of the present invention, apparatus is diagrammatically shown in FIG. 1 to illustrate by way of example one embodiment of the novel system. A storage device, generally designated by the reference numeral 20, is shown having substantially a rectangular configuration. Partitions 21, parallel to the outer walls of the storage device 20, define a plurality of slot-shaped cells 22 for accommodating panel shaped articles such as segments of microfilm. The outer surfaces of storage device 20 frame a rectangular access area in which the open ends of cells 22 are disposed, i.e., each cell is accessible through an open end lying in a plane common to the open ends of all the cells. A transport assembly 23 is disposed adjacent the access area, and which assembly is provided with a driven member 24, shown schematically in FIG. 1. The present invention involves a system for accurately translating such driven member to a position opposite the open end of any preselected cell 22. It should be noted that, by placing transport assembly 23 between like storage devices 20' and 20" (FIG. 2) having opposing access areas, the driven member 24 may be transported to cells in either device.

The features of the present invention are such that the nature of the driven member need not be developed in detail. Thus, for the sake of brevity, driven member 24 is illustrated as comprising a flat panel shaped member having a cross-section similar to the shape of cells 22. It should be understood, however, that such member could be adapted in a conventional manner to automatically remove stored articles from a selected cell when positioned adjacent thereto. Likewise, a retrieved article returned by means of such carrier to a position adjacent an associated cell could be automatically reinserted into the cell by known means forming no part of the present invention.

More specifically, transport assembly 23 (FIG. 1) includes a supporting framework, generally designated by reference numeral 25, for movably supporting a carrier assembly 26 adapted to transport driven member 24 to the storage cells 22 in accordance with manual selection effected by a remote keyboard (not shown) having indicia representing the cell locations. Motive means are provided to motivate driven member 24 in mutually perpendiuclar directions, and which motive means include a horizontal drive motor 27 and a vertical drive motor 28 for rotatably driving a horizontal lead screw 30 and a vertical lead screw 31, respectively. Carrier assembly 26 is reciprocally driven in a horizontal direction by means of horizontal lead screw 30 and an associated traveling nut assembly 32 cooperating in a well known manner. This results in horizontal translation of driven member 24. Drive of driven member 24 in the vertical direction is effected (simultaneously, if desired) by vertical lead screw 31 and a cooperating traveling nut assembly (not shown) associated with driven member 24. The vertical translation is with respect to the carrier assembly 26, which extends orthogonally relative to the horizontal direction of travel. Sensing means, comprising a linear commutator assembly 33, are shown schematically in FIG. 1 to illustrate the manner in which the vertical position of driven member 24 is sensed. A fixed vertical commutator member 34 mounted on carrier assembly 26 is scanned by slidably engaging means (not shown) affixed to the drive member by an L-shaped bracket 35. The position of the slidably engaging means along fixed vertical commutator member 34 is utilized to provide vertical positioning data relating to the horizontal contiguous rows of storage cells 22. A similar commutator assembly (not shown) is secured to a horizontal member 36 and a motor mounting plate 37 to provide horizontal positioning data corresponding to the position of carrier 24 along member 36. The horizontal positioning data relates to the vertically contiguous columns of cells 22.

The remainder of the description of the present invention is set forth under the following headings: Transport Assembly, Commutator Assembly, General Electromechanical Relationships, and Operation. The transport assembly, mentioned briefly above, comprises the structure employed for carrying out the mechanical positioning of driven member 24 (FIG. 1) with respect to storage device 20. The commutator assembly, also mentioned briefly above, is utilized to conduct current for enabling the motivation of driven member in accordance with the physical position of the driven member with respect to mutually perpendicular axes extending in the two directions of translation. The general electromechanical relationship between the commutator assembly and the motivating portion of the transport assembly necessitates means to provide electrical data for overall system control in response to manually inserted input data corresponding to a selected destination, i.e. depression of a key corresponding to a particular storage cell 22. Throughout the descriptive matter set forth under the several headings the various assemblies are interrelated as required to illustrate the operative cooperation therebetween. The overall operation of the entire control system, specifically set forth under Operation, includes detailed explanations of the various circuitry arrangements utilized in the illustrated embodiment.

Transport Assembly

Transport assembly 23 includes a supporting framework generally designated by reference numeral 25 (FIGS. 1, 2, 3 and 4), carrier assembly 26 (FIGS. 1, 3 and 4) for transporting driven member 24, and motive means associated with the carrier and framework for positioning driven member 24 with respect to mutually perpendicular axes, illustrated by direction arrows Y and X in FIGS.

2 and 3, respectively. Storage devices 20' and 20" shown by broken lines in FIG. 2 are mounted in face to face relationship flanking the transport assembly and with the planes of the access areas parallel to the X and Y axes. During the operation of subject system, driven member 24 is ultimately disposed adjacent a selected cell as a result of controlled and accurate translation thereof with respect to the X and Y axes. In light of such orthogonal relationship, henceforth when referring to positioning of the driven member, general X and Y coordinate terminology will be employed. Further, it should be initially noted that the driven member, generally designated by reference numeral 24, comprises a main body portion 38 (FIGS. 2 and 4) and an extending channel member 40 attached to the underside thereof. Although the particular shape of the article to be retrieved and/or stored is not a limiting factor of the present invention, the driven member in the illustrated embodiment is shown with equally extending portions of channel member 40 projecting from opposite sides of the transport assembly for dual-sided manipulation of strip type articles. Further, body portion 38 could conceivably be adapted to drive channel member 40 along a path perpendicular to the planes of the access areas for the purpose of facilitating bidirectional retrieval and storage of articles in the storage devices 20' and 20", without affecting the scope of operation of the transport assembly as it relates to the subject system. The present invention, however, is principally concerned with drive and control thereof in the X and Y directions of travel and does not specifically involve means for handling articles when the destination of driven member 24 is attained.

Mroe specifically, transport assembly 23 comprises framework 25 including end panels 41 and 42, supported in spaced parallel relationship by a horizontal rod 43, horizontal member 36 and a base member 44. End panels 41 and 42 are rigidly secured together by the supporting members in any suitable manner, e.g., coaxially disposed screws 45 at the ends of horizontal rod 43. A horizontal guide strip 46, secured to base members 44, lends further lateral support. Horizontal lead screw 30 extends between panels 41 and 42, and is journalled for rotation therein. Horizontal drive motor 27, mounted on end panel 41 by bracket 47, is coupled to horizontal lead screw 30 by means of a driving pulley 48 (secured to the horizontal drive motor shaft 50), an endless belt 51, and a driven pulley 52 secured in coaxial relationship to the end of horizontal lead screw 30. This relationship gives rise to rotation of lead screw 30 under conditions where horizontal drive motor 27 is energized, the direction and speed of lead screw rotation being directly proportional to the direction and speed of motor shaft rotation. Operatively associated with horizontal lead screw 30 is a conventional traveling nut assembly 32. The nut assembly is illustrated as a housing which is an integral part of carrier 26, thereby providing transmittal of force to same. Horizontal motion is thus imparted to carrier assembly 26, which is slidably supported on framework 25 is a manner now to be described.

Carrier assembly 26 comprises an upper panel member 53 and a base panel member 54 secured in spaced parallel relationship by three similar vertically extending rods 55, 56 and 57, and a carrier mounting bracket 58. Support for the carrier assembly is provided by horizontal lead screw 30 and horizontal rod 43. The lead screw is associated with a traveling nut arrangement 32 which is affixed to upper panel member 53, thereby affording support to the entire carrier assembly 26 regardless of the relative horizontal position thereof. Horizontal rod 43 extends in parallel relationship with lead screw 30 and affords further support to carrier assembly 26 by means of a bearing member 60 having a cooperating bearing surface in sliding engagement with the outer surface of the rod. Bearing member 60 is substantially block shaped in configuration and is affixed to upper panel member 53 permitting bidirectional horizontal travel of the carrier assembly along the axis of rod 43. Horizontal travel is further stabilized by rollers 61 (FIG. 2) rotatably affixed to base panel member 54 for rolling engagement along opposite sides of horizontal guide strip 46.

Vertical lead screw 31 extends between upper and base panel members 53 and 54, and is journalled for rotation therein in any conventional manner at bearing housings 62 and 63 (FIG. 2). A block member 64 is affixed to and extending from upper panel member 53, from which block motor mounting plate 37 extends downwardly at right angles to the upper and base panel members of the carrier. Vertical drive motor 28 is mounted on motor mounting plate 37 and is coupled to vertical lead screw 31 by means of a driving pulley 65, an endless belt 66, and a driven pulley 67. An extending integral portion of vertical lead screw 31 provides a coaxial seat for driven pulley 67 and thereby rotation of vertical lead screw 31 is effected in a manner similar to rotation of horizontal lead screw 30. It should be noted that the entire vertical motor assembly is mounted on the horizontally moving carrier assembly 26. Thus, under conditions where vertical drive motor 28 is energized, vertical lead screw 31 is rotated notwithstanding the relative horizontal position thereof. The fact that vertical drive motor 28 operates at various positions along a known path gives rise to the necessity of a conventional cable drape arrangement (not shown) for providing energization thereto. Sliding contacts or the like may also be utilized for this purpose.

Vertical translation of driven member 24 is effected by conventional operative coupling between vertical lead screw 31 and a traveling nut arrangement (not shown) mounted in the body portion 38 of the driven member 24. During vertical translation, guidance of driven member 24 is provided by vertically extending rods 55, 56, and 57 registering with vertical apertures in body portion 38. Bearing sleeves 38 mounted in the apertures facilitate registration and enable snug sliding engagement during vertical translation.

The subject control system in the illustrated embodiment includes the foregoing transport assembly. A unique feature of such transport assembly is a novel mechanism for counteracting pendulous force exerted on carrier assembly 24 during horizontal translation thereof. The pendulous force present results from the relative size and shape of the carrier with respect to gravity and the position in which motivating force is exerted thereon. It has been found that in the absence of such mechanism, under conditions where carrier assembly 24 is in the position shown in FIG. 4 (for example) and horizontal lead screw 30 is rotated in a direction tending to translate carrier assembly to the right, motion of the lower portions of the carrier (such as base panel member 54) lags the motion of the upper portions due to a moment about the center of the traveling nut. Thus, the carrier assembly is askew an amount depending on the tolerances of the guide means, the speed of operation, etc. This askew condition gives rise to inaccurate horizontal positioning of driven member 24, i.e., a particular rotation of horizontal lead screw 30 will correspond to a slightly different X distance along the screw axis then along the actual path of driven member 24, resulting in misalignment of the driven member with respect to the selected storage cell.

Figure 4:
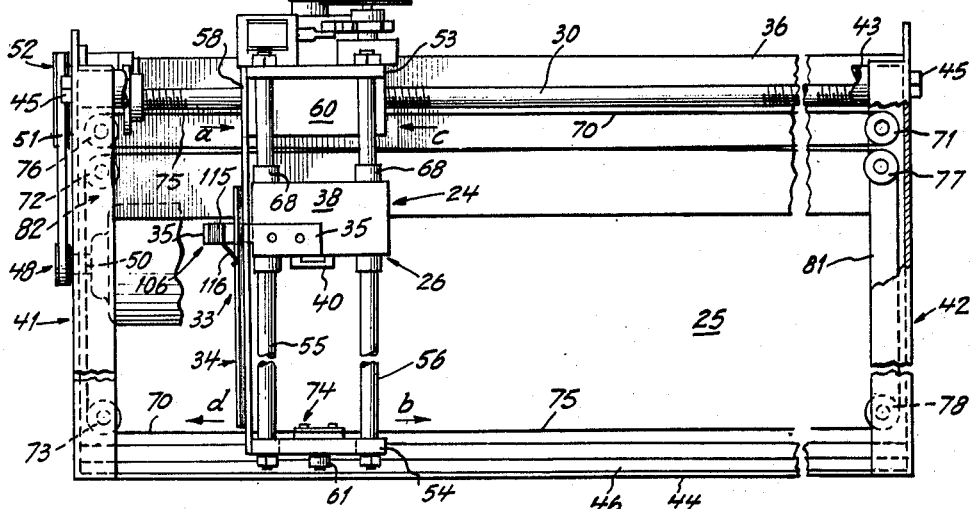
FIG. 4 is a fragmentary side elevation corresponding to the transport assembly as viewed in FIG. 3.

A cable and pulley arrangement is utilized to provide counteracting force to overcome the askew disposition. Referring to FIG. 4, a first cable 70 extends outwardly from carrier assembly 26 around a pulley 71, back to pulley 72, down and around pulley 73 and finally back to carrier assembly 26, where the end thereof is secured to a stud 74 affixed to base panel member 54. A second cable 75 also extends from carrier assembly 26 along a path similar to the path of first cable 70. The second cable is wrapped around a pulley 76, back to a pulley 77, downwardly to and around a pulley 78, and finally back to carrier assembly 26, where the second cable is secured to a stud 80, affixed adjacent to stud 74 to base panel member 54. Pulleys 71, 77 and 78 are rotatably mounted on an extending flange portion 81 (FIGS. 3 and 4) of end panel 42. Pulleys 76, 72 and 73 are rotatably mounted on an extending flange portion 82 of opposing end panel 41. Cables 70 and 75 are secured to the carrier assembly 26 by means of a rotatably mounted rod 83 (FIG. 6) extending through upper panel member 53 and block member 64 (FIGS. 3 and 6), and having a hub 84 coaxially affixed at one end thereof. Cable 70 is guided around a roller 85 (FIG. 7), wrapped on hub 84 and secured thereto by a set screw 86. Likewise second cable 75 is led around a roller 87, wrapped on hub 84 in the opposite direction from cable 70 and secured thereto by a diametrically opposed set screw 88. A biasing member 90 comprising hub portion 91 and a lever arm portion 92, is affixed to the other end of rod 83. A coil spring 93 is secured to the outer end of lever arm portion 92 to exert torque on rod 83 in a direction tending to wrap cables 70 and 75 about hub 84. This arrangement provides sufficient biasing tension on cables 70 and 75 to overcome slack due to cable wear, pulley wear, cable vibration, etc.

In operation of the system under conditions where carrier assembly 26 is being translated in the X direction a force is exerted on cable 75 in the direction of arrow $a$ (FIG. 4). A substantially equal force is transferred along cable 75 and is exerted on the carrier in the direction of arrow $b$. During operation in the opposite direction a force is exerted on cable in the opposite direction (arrow $c$), while a substantially equal force (arrow $d$) is transferred to the carrier in a similar manner. Thus, as the carrier is translated and a pendulous force tends to cause askew disposition of carrier assembly 26, a simultaneous force is exerted by the cable arrangement to counteract same and provide for accurate positioning of driven member 24.

Figure 5:
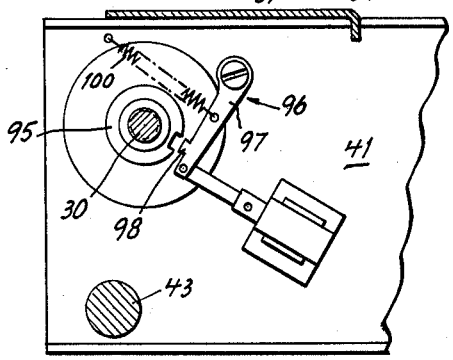
FIG. 5 is a sectional view taken along line 55 of FIG. 3.

A detent pawl mechanism 94 is provided to further assure accurate positioning of driven member 24. A horizontal mechanism (FIG. 5) includes notched hub 95 coaxially affixed to lead screw 30 (FIG. 3). A pawl 96 comprising a lever arm 97 and an integral tooth 98, is pivotally mounted and biased by a spring 100 to register with notched hub 95. A solenoid 101 is provided to disengage pawl 96 and hub 95 when in the energized condition (position shown). This mechanism is only shown in FIG. 5.

A similar detent pawl mechanism, generally referred to by reference numeral 102 (FIG. 3), is associated with the vertical lead screw 31. A solenoid 103 is provided to disengage a pawl 104 from a notched hub 105. Reliable positioning is enhanced by the foregoing detent mechanism in that once a position is reached by driven member 24 it is "locked in" until such time as another selection is made and the pawl mechanism is disengaged. The operation of the detent mechanisms presupposes that the relationship between the lead screws and the linear translation of the driven member is a precise ratio proportional to revolutions of the related notched hub.

Commutator Assembly

The fixed vertical commutator member 34, shown schematically in FIG. 1 is mounted on carrier mounting bracket 58 (FIGS. 2, 3 and 4). The L-shaped bracket 35 shown in FIG. 1 is also shown in detail in FIGS. 2, 3 and 4. It should be noted that one arm of L-shaped bracket 35 is secured to the body portion 38 of driven member 24, while the other arm of L-shaped bracket 35 extends transversely and is spaced from the surface of fixed vertical commutator member 34. FIGS. 3 and 4 show schematically a sliding brush assembly 106 mounted on L-shaped bracket 35 and extending for sliding engagement with the adjacent portion of vertical commutator member 34. The brush assembly is operatively associated with vertical commutator member 34 at an area established by the vertical position of driven member 24. FIGS. 8, 9, 9a and 9b show the vertical commutator assembly in detail. Prior to further detailed explanation, the horizontal commutator assembly will be briefly set forth to establish its similar nature with respect to the vertical assembly. A fixed horizontal commutator member 107 is mounted on horizontal member 36 (FIGS. 2 and 3), with an associated brush assembly 108 (FIG. 2) affixed to the back of motor mounting plate 37. Brush assembly 108 is operatively associated and in sliding engagement with horizontal commutator member 107 at an area established by the horizontal position of the carrier assembly.

The vertical and horizontal commutator assemblies both comprise a movable brush assembly operatively associated with a stationary member in the same general manner. For convenience only the structure of the vertical commutator assembly will be described in detail with reference being made to the horizontal assembly in a few instances where necessary for clarity.

Vertical commutator member 34 is shown in FIG. 8 as it relates to carrier mounting bracket 58 to which it is secured. Member 34 comprises a plurality of side by side conductive elements 110, most of which have one or more nonconductive surface regions arranged in a predetermined pattern with respect to the storage device. Each element 110 is further provided with electrical interconnecting means comprising wires 111. The nonconductive surface regions are illustrated by shaded areas designated U-1 to U-200, T-1 to T20, and H-1 to H-2. The thickness of each storage cell 22 corresponds to the common longitudinal thickness of the regions designated with a U prefix. Such regions, generally designated by reference numeral 112 in FIGS. 9, 9a and 9b, extend only partially through the associated element 110 and therefore electrical continuity is permitted throughout each element, i.e., current is only interrupted to the extent that the surface regions themselves are not conductive. The elements 110 are longitudinally separated by insulating barrier strips 113, and have guide strips 114 embedded therein. Insulating barrier strips 113 extend the length of member 34 and afford complete electrical isolation (FIG. 9b) between adjacent elements. Guide strips 114 are merely provided as physical guide means in conjunction with brush assembly 106 (FIG. 9) now to be described.

Brush assembly 106 is attached to driven member 24 and traverses member 34 as described above. An arm of L-shaped bracket 35 extends across elements 110 and carries a brush mounting block 115 with a plurality of interconnected brushes 116 embedded therein. The contact end 117 of each brush (FIG. 9a) is adapted for sliding engagement with the surface of an associated element 110. Brushes 116 are connected in pairs for the purpose of providing electrical continuity between adjacent elements 110 under condition when the brushes involved are not in contact with a nonconductive region 112. Each brush is associated with a particular element, and to assure such relationship strips 114 are interposed midway between the edges of the elements to provide track-like slots to guide the brushes associated therewith. The elements each have two brushes bearing against side by side slots and thereby provide continuity between adjacent brush pairs in the absence of insulating regions 112. Brush assembly 106 is secured to driven member 24 such that the brushes 116 contact elements 110 along an imaginary horizontal line corresponding to the horizontal position of the storage cell row adjacent driven member 24 at the related carrier position. Thus, in the illustration shown, 200 vertical rows of cells are represented by corresponding regions on vertical commutator member 34. Under conditions where driven member 24 is at a vertical position corresponding to a particular row of cells, the brush assembly 106 will be necessarily positioned with one of the brushes 116 contacting the corresponding insulated region 112, whereupon continuity between the contiguous brush pairs bearing thereagainst is interrupted.

The horizontal disposition of the cell columns corresponds in a like manner to similar insulated regions on a horizontal commutator assembly. FIG. 10 shows a sectional end view of a horizontal commutator assembly mounted on horizontal member 36. The horizontal brush assembly 108 is mounted on motor mounting plate 37 whereby brushes 116' are disposed for sliding engagement with associated horizontal elements 110' in the same general fashion as described in discussing the vertical commutator assembly. To this end barrier strips 113' and guide strips 114' are provided. Guide blocks 118 extend from mounting plate 37 and are provided with bearing slots 120 which register with the edges of horizontal member 36 to assure accurate sliding engagement.

General Electromechanical Relationship

The conditions under which horizontal drive motor 27 and vertical drive motor 28 are energized determine the position to which driven member 24 is translated. FIG. 11 comprises a schematic illustration which includes a keyboard 121 having an array of switches, S1 through S6, which are associated with indicia (not shown) corresponding to positioning data. When a particular cell is selected the switches corresponding to the cell designation are closed. This establishes electrical data which enables further circuitry for energizing motors 37 and 38. The enabling circuitry is controlled by the position of the brush assemblies 106 and 108 with respect to their associated commutator members 34 and 107, respectively. In FIG. 11, a simplified commutator assembly is illustrated to explain the interrelation of the drive motors and the keyboard input commands. The overall block diagram of the subject control system is shown at FIG. 12. Keyboard 121' is electrically connected to X and Y commutator assemblies 122 and 123 (see wires 111, FIG. 8). The commutators are in turn coupled to control and switching circuitry 124 and 125 for accurately enabling associated motor drive circuits 126 to energize motors 27' and 28' for translating drive member 24'. Broken lines 127 and 128 illustrate that there is a physical relationship between driven member 24 and X and Y commutator assemblies 122 and 123, which relationship is a key factor in the overall control function of subject system.

Assume for the purpose of the FIG. 11 illustration that the commutator assembly comprises eight commutator elements CU, C1, C2, C3, C4, C5, C6 and CD, an associated brush assembly with seven sliding brush pairs B1-B7, nonconductive surface regions, A, B, C, D, E and F, arranged as shown, and a keyboard with six switches, S1-S6. The principles now to be described with respect to the FIG. 11 illustration are equally applicable to a commutator assembly having any convenient numbers of elements and associated brush pairs depending on the stopping positions desired.

The keyboard switches S1-S6 are mechanically interlocked so that when one switch is closed all others are open. Initially switch S4 is closed and the brushes are in position I, which corresponds to a particular position of the driven member. If it is desired that the driven member be translated to the position corresponding to position II of the brushes the following operation occurs. A keyboard input command is initiated by closing switch S1, and S4 automatically is released to an open condition. Current IU flows from + through S1 and C1, to B1 and CU in the direction indicated. The path to CD is blocked by surface region D. The current flow IU is utilized to energize an associated drive motor which in turn translates the brush assembly in an "up" direction toward position II. During such translation the current path to DC remains blocked. When the adjacent brushes of B1 and B2 reach the surface region A on C1 all current is blocked and the brush assembly comes to rest in position II.

To further explain the directional aspects of the illustrated operation assume that it is desired to translate the brush assembly from position II to position III. A keyboard command is initiated by closing switch S6 (S1 automatically opens). Current ID flows from + through S6 and C6, to B7 and CD in the direction indicated. The path to CU is now blocked by surface region A. The current ID is utilized to energize the associated drive motor in an opposite direction which thereby translates the brush assembly in a "down" direction. The brush assembly comes to rest at position III when the adjacent brushes B6 and B7 reach region F, which interrupts current flow.

The foregoing description relates to a commutator with six stopping positions, i.e., six corresponding storage cells. To increase the number of stopping positions in the most efficient manner a numerical place system is used. For example, in the commutator comprising member 34 (FIG. 8) 200 positions are made available by employing three sections of elements side by side, i.e., the "units" section including regions U1–U200, the "tens" section including regions T1–T20, and the "hundreds" section including regions H1 and H2. The "tens" and "units" sections each include up and down conductors (similar to CU and CD) and 10 interlocked switches. The "hundreds" section consists of two interlocked switches and also up and down conductors. Insulated regions H1 and H2 are one-half the length of member 34, while regions T1–T20 are each substantially one-twentieth of the length, and U1–U200 are substantially one two-hundredth of the length of member 34.

Operation

Figure 13:
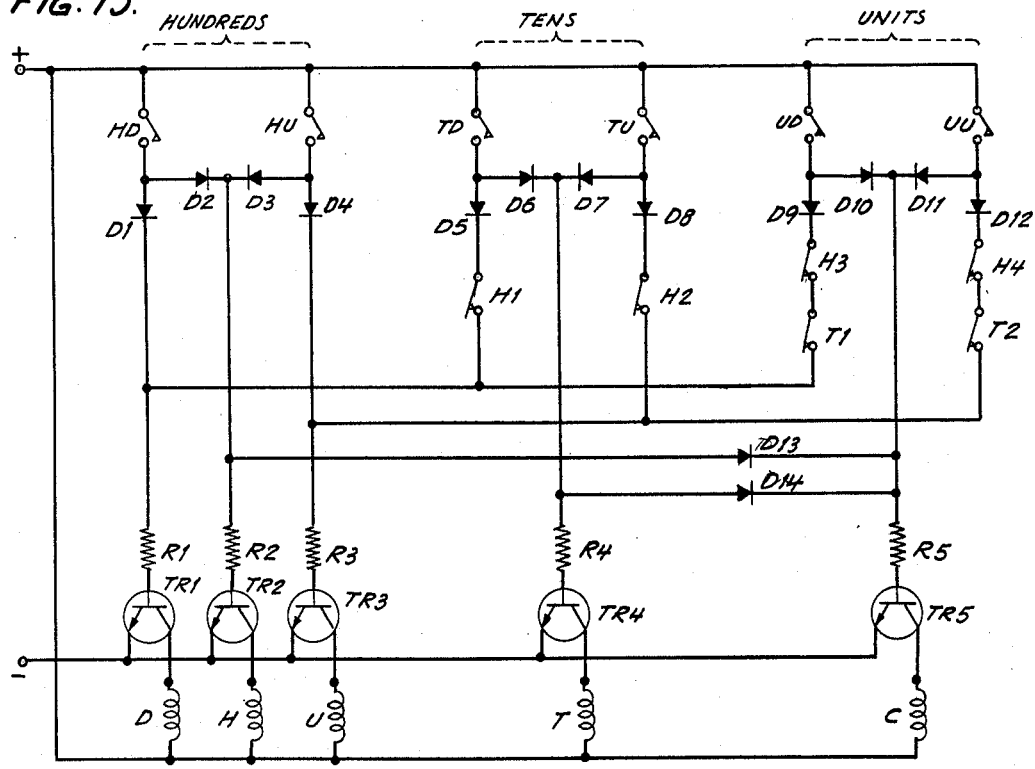
FIG. 13 is a schematic diagram showing the electrical control network employed in the illustrated embodiment.
Figure 15:
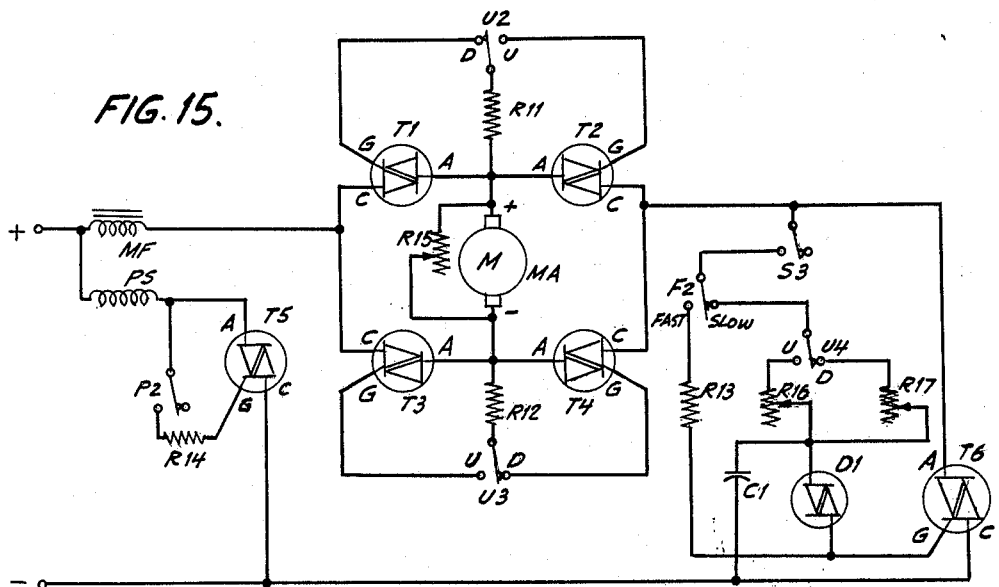
FIG. 15 is a schematic circuit drawing of a motor and associated drive circuitry employed in carrying out the present invention.

An understanding of the foregoing structure as it relates to the circuitry of FIGS. 13, 14 and 15 can best be gained from a description of the sequence of operations of the circuitry considered in conjunction with the overall interrelationship of the system as diagrammatically shown in FIG. 12. The control network of FIG. 13 is electrically connected to an associated commutator assembly. Inputs signals, derived in accordance with the position of the selected destination of the driven member, sequentially switch transistors TR1–TR5 for energizing relay coils D, H, U, T and C. After control network operation is initiated, the switching circuitry of FIG. 14 is electrically interposed by virtue of interrelated relays. Coils P, F, A and B then operate with the control network to provide proper input for the drive circuitry (FIG. 15) for motor M. The motor is driven in both directions at fast and slow speeds for a duration determined by the distance of drive member travel. Reversal of motion after overshoot is also provided for by the drive circuitry.

The control network (FIG. 13) receives current from the commutator elements of an associated commutator assembly. Assuming the FIG. 8 embodiment comprises the associated assembly, then as discussed above current will be present in the "up" or "down" element of the "hundreds," "tens" and "units" sections, i.e., a maximum of three signals will be present. To this end switches HD, HU, TD, TU, UD and UU represent the six elements concerned and when current is present in an element it is considered electrically as a closed switch. It should be noted that current can be simultaneously present in different section "up" and "down" elements under conditions described above; however, the network responds to only one sectional output at a time insofar as directional information is concerned. Response is to the highest decimal place section having current present, thus avoiding conflicting "up" and "down" signals.

For example, assume that the operator has last made a keyboard selection corresponding to position "199" of the vertical commutator assembly shown in FIGS. 8 and 9. Upon completion of a positioning cycle, driven member 24 comes to rest opposite a storage cell in the row of cells corresponding to the vertical position of region U–199 (FIG. 8). In the rest position HD, HU, TD, TU, UD and UU are open, and contacts H1–H4 and T1–T2 are initially closed, as shown. Now assume that the operator makes a keyboard selection corresponding to position "028" of the vertical commutator. As such time HU, TU and UU remain open, while HD, TD and UD close. Upon engagement of contacts HD a circuit is completed through coils D, H and C, while contacts TD and UD complete circuits through coils T and C, respectively. Contacts H1–H4 and T1, T2, associated with coils H and T are opened in response to coil energization.

Relay coils T and H determine the sequential sensing, coils U and D determine the direction of translation and coil C provides main control of motor energization. Coils U and D are operatively associated whereby one is closed when the other is open. The operative function of these relays will become more apparent when consideration is given to the circuitry of FIGS. 14 and 15.

In the first step of the positioning sequence, current flows through HD, D2, R2, fires TR2 and energized H, which opens contacts H1–H4, as previously mentioned. Current also flows through D1, R1, fires TR1 and energizes relay coils D. This sets the condition for the motor (when started) to drive the vertical brush assembly in a "down" direction. Simultaneously relay coil C is energized (through D2, D13 and R5 firing TR5) to set the condition for starting the motor associated with the vertical brush assembly. Also, since current flows through D6, R4, firing TR4, relay coil T is energized to open contacts T1 and T2.

The brush assembly moves in a "down" direction until it reaches region H–1, at which time HD opens. Relay coils H and D become deenergized and contacts H1–H4 close. Now, TD being closed, current flows through TD, D5, H1, R1, firing TR1 and reenergizing coil D. Current also flows through D6, R4, firing TR4, energizing coil T, and opening contacts T1 and T2 to disrupt current flow through flow through D9 and D12. Coil C remains energized via D6, D14, R5 and TR5. Therefore, the brush assembly continues to travel in a "down" direction.

When the brushes arrive at region T–3 in the "tens" section of the commutator (and still within region H–1 in the "hundreds" section), TD opens and HD remains open. Now UD is closed and current flows through UD, H3, T1 (both the latter are closed since coils H and T are now deenergized), R1, firing TR1, energizing coil D. Current also remains flowing through D10, R5, TR5 and relay coil C. The brush assembly continues to travel in a "down" direction until the brushes arrive at region U–28 of the "units" section of the commutator at which time the system becomes completely deenergized and the driven member comes to rest at the preselected destination.

It should be noted that in the event that the deenergization response does not occur fast enough to stop the brushes at position "028" travel will continue "down" toward position "027," resulting in closure of UU, i.e., current flow in the "up" element of the "units" section of the commutator. Current will flow through UU, H4, T4, R3, firing TR3 energizing relay coil U. Current will also flow through D11, R5, TR5 and C, thereby providing conditions for reversing the direction and energizing the motor to move the brush assembly in an "up" direction to return same to the actual preselected position "028."

Switching circuitry (FIG. 14) is conditioned during operation of the foregoing control network. To this end it can be said that the inputs to the switching circuit are relay contacts C1–C4 (associated with coil C, FIG. 13), and relay contacts U1 which is associated with coils D and U and is designated as having positions U and D corresponding to respective energization. Another input consists of relay S (not shown) with contacts S1 and S2, which is disposed for activation when the corresponding detent pawl is not in registration with the associated notched hub, described above in conjunction with the transport assembly, e.g., FIG. 5 arrangement. The output comprises actuation of relay coils P and F, which drive associated arrays of contacts, among which are F1 and P1 used internally in the switching circuit. Coil P also initiates operation of the associated pawl solenoid (FIG. 5), which enables relay S (not shown). Relays A and B with contacts A1, A2 and B1–B4 are contained within the switching circuit as an integral part thereof.

Under normal rest conditions, relay coils P, F, A and B are deenergized and the associated contacts are as shown throughout the circuit. Assuming that the selection discussed above is made, i.e., translation from position "199" to "028," the coil C becomes energized and switches C1–C4 toggle, and U1 remains in the D position, due to energization of coil D and not coil U (FIG. 13). This results in coils P and F becoming energized in the following manner. Coil B is energized by current from + through S1, D30, C3 and A2, causing associated contacts B1–B4 to toggle. A circuit is then complete from + through, S1, D31, C4, B3 to energize coil A which in turn toggles A1 and A2. When A2 toggles, the original path to coil B is interrupted but coil B remains energized by virtue of contacts B4. A2 now becomes the path for current to coil F, which toggles F1 giving rise to a current path to coil P through U1 (D position) D28, A1, and D22 or D23, S2, D24, D25, A1 and D22. Coil P toggles P1, and S1 and S2 change when the pawl is disengaged resulting in deenergization of coil B. As the brush assembly travels "down," coils P, F and A remain energized, P through S1 and C1, F through F1, U1, D29, C3 and A2, and A through U1, D28, A1 and D26. When travel is "up" coil B remains energized (along with P and F) through U1 and coil A is deenergized.

As mentioned above, when the brush array reaches position "028" coil Cl is deenergized changing switches C1–C4 back to the position shown. This deenergizes coil F (C3 opens) and opens contacts F1 deenergizing coil A. When coil F is deenergized the motor is switched to "slow" mode (explained in conjunction with FIG. 15 circuitry) and if pawl 104 (see FIG. 3) does not engage the appropriate notch in hub 105 (due to switching reluctance delay, inertial overtravel, or the like) contacts S1 and S2 remain toggled opposite to the positions shown in FIG. 14 even though coil P is deenergized. This condition enables P to become energized through S1 and C1, when the brush assembly reaches the next adjacent region in the "units" section of the commutator as coil C becomes energized. Switch U1 changes to U, due to energization of coil U and related motor reversal. Current flow to coils A, B and F is blocked and "slow" mode is maintained (F deenergized) until the brush assembly returns to position "028." Upon reaching "028" coil C is deenergized, opening C1–C4 resulting in deenergization of P. During "slow" mode of return travel, pawl 104 is permitted to engage the appropriate notch of hub 105 returning S1 and S2 to their initial position (FIG. 14 position) when P is deenergized. The switching circuitry is now in its initial condition with coils P, F, A and B deenergized and all switch contacts in the positions shown.

The motor drive circuitry (FIG. 15) provides for motor rotation in "up" and "down" directions and in "slow" and "fast" modes. The mode of motor drive is determined by switch F2 associated with coil F (FIG. 14). "Up" and "down" directions of travel depend upon alternate energization of coils U and D (FIG. 13) and the toggle of switches U2, U3 and U4 to position U or D in a manner similar to the operation of switch U1 (FIG. 14).

Again assuming translation of driven member 24 from position "199" to "028." Coils P and F are energized (FIG. 14) as well as coil D (FIG. 13), thereby toggling all P and F switches to the position not shown and all U switches to the D position corresponding to energized D coil of oppositely operating paired coils D and U. When P2 closes, gate controlled switch T5 fires, energizing pawl solenoid PS to disengage the associated detent pawl and thereby switch contact S3 from its normally open position. The gate controlled switches illustrated throughout (T1–T6) are solid state devices of the type which may be gate triggered from a blocking to a conducting state for either polarity of applied voltage. F2, toggled by coil F, conditions the gate circuit of T6 for "fast" mode of operation, i.e., position "fast." Contacts U2 and U3 are in the D position. Thus, a completed circuit through the motor armature MA is provided from +, through the motor field MF, gate and cathode (G and C) of T1, U2, R11, MA, R12, U3, G and C of T4, S3, F2, R13 and G and C of T6. T1, T4 and T6 are fired and motor M rotates for "fast" and "down" operation. Motor M is a universal motor operating from an alternating potential, one polarity of which is shown for exemplary purposes.

When the brush assembly overtravels to position "027" in the "units" section of the commutator as discussed above, contacts U2 and U3 change to the U position, and F2 reverts back to its "slow" position (shown in FIG. 15). Switch contacts S3 remain closed due to non-registration of the detent pawl. A circuit is now provided from + through MF, C and G of T3, U3, R12, MA, R11, U2, G and C of T2, S3, F2, U4(U), R16 and branches off to the negative terminal (—) via C1 or Diac D1, and G and C of T6. This results in a RC charging network which builds to a predetermined potential, fires D1, which enables firing of T6 and then firing T2 and T3. The function of the "slow" mode circuitry is to clip the AC phase, resulting in an effective lowering of the RMS voltage input to motor M and therefore lower the speed thereof. The relative polarity of current through armature MA is now reversed causing opposite rotation for the "up" direction.

When position "028" is finally reached coil P is de-energized opening P2, which opens T5. Solenoid PS is deenergized and permits pawl 104 to engage hub 105 resulting in opening of S3 when registration occurs. This causes T2 and T3 to open stopping power flow to the motor and leaving the entire system at rest.

It is believed that the assumed conditions of operation set forth in the above description of vertical translation are sufficient to illustrate the overall operation of subject control system. Simultaneous translation in the horizontal direction is carried out in a similar manner by like circuitry means to position driven member 24, to thereby effect overall positioning with respect to the X and Y axes at a preselected destination.

Many advantages of the present invention have been explicitly and implicitly set forth throughout the above description, e.g., the accuracy and reliability of the control system regardless of the size of articles being handled. It should again be emphasized that the principles and concept of the novel system make possible completely automatic retrieval of stored articles in response to manually entered keyboard commands corresponding to the positions at which the articles are stored. The system is relatively simple and convenient to service and lends itself to operation at speeds that facilitate handling of articles in large quantities.

Although a specific embodiment of the invention has been illustrated and described in detail by way of example, it is to be understood that the invention is not limited thereto. Various changes may be made in the design and arrangement of parts without departing from the spirit and scope of the invention as defined by the appended claims as will now be understood by those skilled in the art.

What is claimed is:

1. Apparatus for controlling the translation of a driven member from a random position to a selected one of a plurality of predetermined destinations, said apparatus comprising,
   (a) means for movably supporting the driven member, said support means including a laterally movable carrier for supporting the driven member,
   (b) drive means carried by said support means and adapted to drive the driven member to any selected destination, said drive means including means for laterally translating said carrier to impart horizontal motion to said driven member,
   (c) means for energizing said drive means,
   (d) input means for providing electrical data corresponding to any selected destination of the driven member,
   (e) control means coupled to said input means and adapted to selectively connect said energizing means to said drive means in accordance with said electrical data,
   (f) said control means including means for sensing the position of the driven member and means for coupling said energizing means to said drive means under conditions where the position sensed does not correspond to said electrical data,
   (g) said coupling means comprising a plurality of conductive elements disposed in a predetermined pattern and said sensing means comprising means movable with the driven member and adapted to operatively interconnect said elements in accordance with said pattern, and
   (h) means for substantially counteracting any pendulous force exerted on said carrier against the direction of motion under conditions where said drive means is laterally driving said carrier.

2. Apparatus as set forth in claim 1 wherein said carrier is vertically disposed and has top and bottom portions, and said counteracting means include first and second stabilizing means, said first stabilizing means comprising a first cable secured at one end to the top portion of said carrier and secured at the other end to the bottom portion of said carrier, and said first stabilizing means further comprising first pulley means disposed to operatively engage said first cable whereby the ends thereof extend in opposite directions from said carrier and at equal angles with respect to the vertical axis thereof, and said second stabilizing means comprising a second cable secured to the top portion of said carrier in opposition to said first cable, said second cable secured at the other end to the bottom portion of said carrier in opposition to said first cable, and said second stabilizing means further comprising second pulley means disposed to operatively engage said second cable whereby the ends thereof extend in opposite directions from said carrier and at equal angles with respect to the vertical axis thereof, said first and second pulley means mounted in like relationship with respect to the respective cables for transferring force along the cable and imparting same in the direction of carrier motion to offset said pendulous force.

3. Apparatus as set forth in claim 1 wherein said conductive elements comprise a plurality of electrically conductive strips disposed in linear side-by-side fashion, insulating means between said strips, nonconductive surface regions arranged in a predetermined pattern on said strips (thereon), said input means comprise a source of unidirectional power and switching means for selectively interconnecting said source to predetermined strips corresponding to said selected electrical data, and said movable means include means slidably engaging the surface of said strips for interconnecting said unidirectional power across said strips under conditions where said slidably engaging means are not engaging said nonconductive regions, and means for employing said unidirectional power to enable said energizing means.

4. Apparatus for selectively positioning a retrieval mechanism adjacent a device having a plurality of vertically arranged open ended storage cells, said apparatus comprising,
   (a) transport means adjacent the device,
   (b) movably mounted carrier means for supporting said retrieval mechanism on said transport means,
   (c) means associated with said carrier means for sensing the position of said retrieval mechanism relative to X and Y orthogonal axes in a plane through the open ends of the storage cells, (d) motive means including first and second motors adapted to drive the retrieval mechanism in mutually perpendicular directions parallel to said X and Y orthogonal axes, (e) said sensing means including a pair of linearly arranged commutator assemblies for providing electrical data corresponding to the position of the retrieval mechanism along said X and Y axes, (f) means for energizing said motors including a source of power and selective coupling means for permitting energization of said motors by said source of power in accordance with said electrical data to position said mechanism with respect to the relative position of a selected storage cell, and (g) said selective coupling means including means for interrupting said energization of said motors under conditions where said carrier means is adjacent the open end of the selected storage cell.

5. Apparatus as set forth in claim 4 wherein said selective coupling means includes means for attentuating said energization of said motors under conditions where said carrier means is in the vicinity of the selected storage cell.

6. Apparatus as set forth in claim 4 wherein said carrier means has a pair of threaded apertures parallel to said X and Y orthogonal axes, said carrier means further include a pair of lead screws operatively engaging said threaded apertures, and said first and second motors are adapted to rotatably drive said shafts and thereby move said carrier to position the retrieval mechanism with respect to said X and Y orthogonal axes in accordance with the position of said selected storage cell.

7. Apparatus as set forth in claim 6 further including means for counteracting the pendulous force on said carrier means under conditions where said carrier is moving in a direction not coincident with the direction of the gravitational force exerted on said carrier.

8. Apparatus for controlling the translation of a driven member from a random position to a selected one of a plurality of predetermined destinations, said apparatus comprising, (a) means for movably supporting the driven member, said support means including a movably mounted carrier for supporting the driven member, (b) drive means carried by said support means and adapted to drive the driven member to any selected destination, said drive means including first and second motive means operatively connected to said carrier to drive the driven member in first and second mutually perpendicular directions, (c) means for energizing said drive means, (d) input means for providing electrical data corresponding to any selected destination of the driven member, and (e) control means coupled to said input means and adapted to selectively connect said energizing means to said drive means in accordance with said electrical data, (f) said control means including means for sensing the position of the driven member and means for coupling said energizing means to said drive means under conditions where the position sensed does not correspond to said electrical data, (g) said coupling means comprising a plurality of conductive elements disposed in a predetermined pattern, said conductive elements comprising two groups respectively in coordinate planes parallel to said mutually perpendicular directions of travel, (h) said sensing means comprising means movable with the driven member and adapted to operatively interconnect said elements in accordance with said pattern, and said movable means including separate interconnecting means associated with each group and adapted to move with the driven member to interconnect the elements in a vicinity corresponding to the position of the driven member.

9. Apparatus as set forth in claim 8 wherein each group of said conductive elements comprise a plurality of side by side electrically insulated conductive strips having nonconductive surface regions arranged in a predetermined pattern thereon, said interconnecting means disposed in sliding engagement with said conductive elements for electrically connecting the strips, said movable means further comprising means for mounting said interconnecting means transversely adjacent each group of conductive elements, said input means include switching means connected to said conductive elements for providing said electrical data by selectively permitting current flow between said conductive elements by way of said interconnecting means, said control means further include means for employing said selected current flow to enable said motive means, whereby said nonconductive regions are arranged for engagement with said interconnecting means to interrupt said current flow under conditions where said driven member is disposed at the predetermined destination corresponding to the selected electrical data.

10. Apparatus as set forth in claim 9 wherein said interconnecting means comprise a plurality of paired conductive brushes adapted to slidably engage the surface of a different pair of adjacent conductive strips with adjacent brushes contacting a common element to electrically interconnect said strips in the absense of said nonconductive surface regions.

References Cited

UNITED STATES PATENTS

| 2,792,545 | 5/1957 | Kamm | 318—162 XR |
| 3,225,770 | 12/1965 | Lasley et al. | 318—467 XR |
| 3,262,035 | 7/1966 | Gough | 318—18 XR |
| 3,285,437 | 11/1966 | Lemelson | 318—162 XR |
| 3,360,702 | 12/1967 | Lasley et al. | 318—18 |

BENJAMIN DOBECK, Primary Examiner

U.S. Cl. X.R.

214—16.4; 318—33